May 22, 1956 — G. E. STRICKER — 2,746,808
NON-CLOGGING PNEUMATIC CONVEYING APPARATUS
Filed Aug. 24, 1953

INVENTOR.
Gustave E. Stricker
BY
Fearman & Fearman
ATTORNEYS

United States Patent Office 2,746,808
Patented May 22, 1956

2,746,808

NON-CLOGGING PNEUMATIC CONVEYING APPARATUS

Gustave E. Stricker, Saginaw, Mich., assignor to A. T. Ferrell & Co., Saginaw, Mich.

Application August 24, 1953, Serial No. 375,939

3 Claims. (Cl. 302—36)

This invention relates to pneumatic conveying apparatus and more particularly to apparatus of the type used for conveying bulk materials such as grains, seeds and the like.

One of the prime objects of my invention is to design pneumatic conveying apparatus which is non-clogging in nature in that the flow of bulk material to the apparatus is automatically cut off when the discharge end thereof becomes blocked and is not resumed until the blocked condition is relieved.

A further object of the invention is to provide a pneumatic conveyor of the type described in which the flow of material is automatically resumed when the blocking material has passed from the discharge end of the apparatus.

Another object of the invention is to provide a conveying mechanism of the type described wherein the flow of material to the conveyor is automatically regulated to compensate for overloads in accordance with the rate of disposal thereof.

Still a further object of the invention is to design conveying apparatus of this type wherein the forces of gravity can be employed to feed the material into the conveying means and the air pressure from the source of forced air supply holds the valve in open position, said valve being automatically forced to closed position when the conveyor becomes clogged and the back pressure developed overcomes the initial air pressure and swings the valve to closed position.

Another object of the invention is to provide simple yet efficient pneumatic conveying apparatus of strong and durable construction, which can be associated with a mobile screening unit and which requires practically no maintenance.

A still further object of the invention is to design a non-clogging pneumatic conveyor which is well suited to conveying granular bulk materials of many kinds and which can be economically manufactured and assembled.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction, without departing from the spirit, or sacrificing any of the advantages of the invention.

Figure 2:
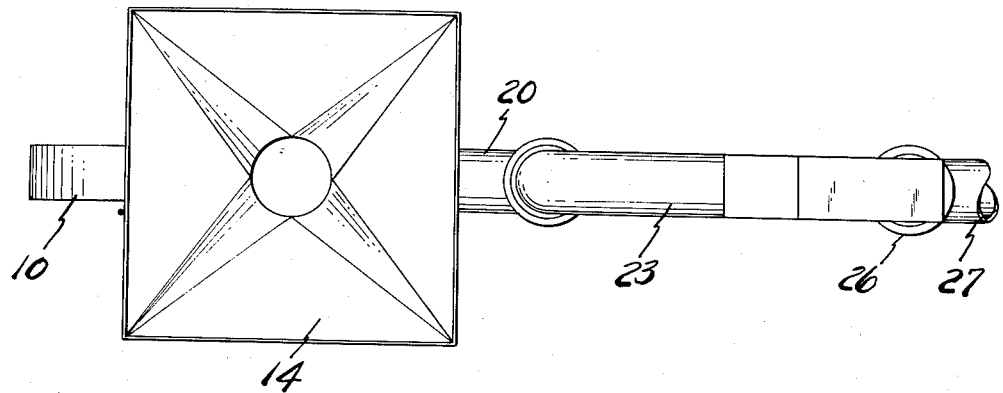
Fig. 2 is a top plan view thereof.
Figure 1:
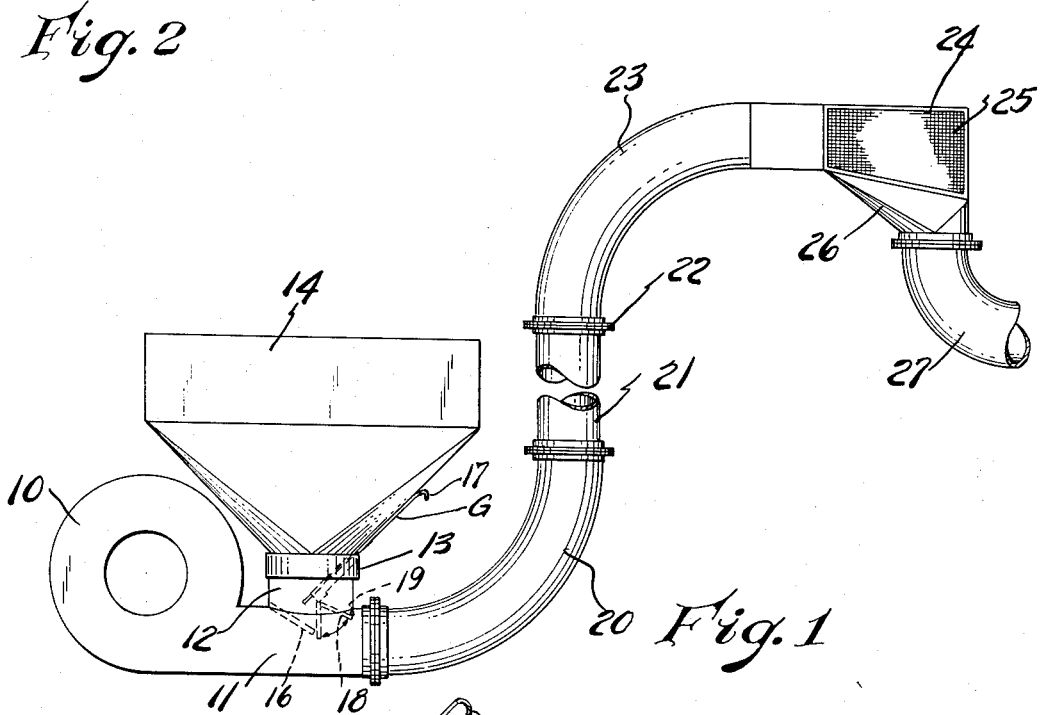
Fig. 1 is a side elevational view of my conveyor unit, the broken lines indicating the discharge passage and extreme positions of the flow control valve.

Referring now more particularly to the accompanying drawing wherein I have shown the preferred embodiment of my invention, a letter C generally indicates my conveying apparatus which is very satisfactorily employed with various types of seed and grain cleaning machinery including mobile seed cleaning units, either drawn or self-propelled, of the type used for traveling from one location to another.

The conveying unit C comprises a fan casing 10 including a horizontally extending air duct 11 which is provided with an intake pipe 12 opening into the upper wall thereof. A blower fan (not shown) is provided within the casing 10 and is driven away from any suitable source of power to deliver a high velocity stream of air or air blast to the duct 11. Telescoping over the upper end of the pipe 12 is a collar 13 provided on the lower end of a feed hopper 14 which feeds the grain or seed (not shown) into the duct 11. Mounted in the upper end of the pipe 12 is a discharge plate 15 extending obliquely within the pipe 12 and mounted thereunder on the lower end of said pipe is an opposed, cooperating plate 16 which extends obliquely in the opposite direction into the duct 11. Grain or seed (not shown) flows from hopper 14 between the plates 15 and 16 and thence into duct 11, these plates 15 and 16 controlling the passage of material to the duct and may be adjustable, if desired, to vary the discharge opening therebetween, but means for accomplishing this result will not be shown or described, since such are well-known in the art and form no part of the instant invention.

An adjustable gate G is provided for sliding travel on the plate 15 to regulate the area of the discharge opening D provided between the plates 15 and 16, said gate having a turned section 17 on the upper end thereof to facilitate operation thereof.

Figure 3:
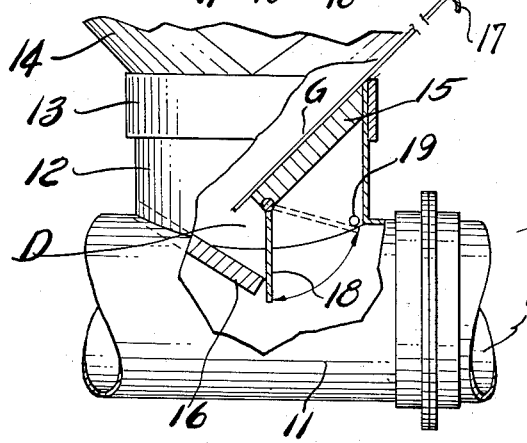
Fig. 3 is an enlarged, fragmentary, side elevational view, partly in section, showing the automatically operated flow control valve in closed position to cut off the flow of material to the duct, the broken lines indicating the open position of the valve.

Hingedly mounted on the lower edge of the plate 15 is a gate valve 18 which in one position shown in solid lines in Fig. 3 of the drawing closes the discharge opening D and cuts off the flow of material from the hopper to the duct 11. Normally, the valve 18 is swung rearwardly to open position (see broken line position in Fig. 3), by the air from the fan (not shown) and pressure of the material to admit a continuous flow of material to the duct 11. A stop member 19 limits the extent to which the valve 18 can be opened.

From the duct 11, the grain which is carried along in the high velocity air blast, moves through a duct system which may comprise an elbow fitting 20, a riser 21, and another elbow fitting 22, all of which are suitably joined together as shown. A duct 23 connected to the elbow fitting 22 includes air escape openings 24 in the side wall thereof covered by large mesh screen 25, and a discharge chute 26 opens into a material discharge pipe 27 which leads to the shaker screen (not shown). It will be readily apparent that the high velocity air carrying the material upwardly exhausts through the screen mesh 25, carrying with it all entrained dust particles and foreign matter escaping out the openings 24, the grain or seed discharging into the chute 26.

In operation, a blocking of the duct 23, as when the system is overloaded, will soon cause the blocking of the air escape opening 25, and continued operation of the device then creates a back pressure which will force the valve 18 to closed position, thus cutting off the flow of material to the duct 11. As soon as the material blocking the air escape opening 24 has passed into the discharge chute 26, the back pressures are relieved and the valve 18 re-opens automatically.

From the foregoing description, it will be obvious that I have perfected a very simple, practical pneumatic conveyor which will not easily clog nor remain clogged for any appreciable length of time.

It is to be understood that various changes may be made in the form, shape and size of the various component

What I claim is:

1. In a pneumatic conveyor, a conveying duct, a fan delivering a high velocity stream of air thereinto, material discharge and air escape openings in one end of the duct, a gravity discharging material hopper emptying into said duct interjacent the ends thereof, a plate projecting obliquely into said duct to guide the flow of material therein, a second plate thereabove and extending obliquely in an opposite direction to the first-mentioned plate, and a valve hingedly mounted on the terminal edge of said second plate and normally closed operable by the pressure of the material and air stream to permit the flow of material through the discharge space between said plates and operable to close off said space when said discharge and escape openings are blocked and sufficient back pressures are created.

2. In a pneumatic conveying apparatus for grain, seeds and the like, a generally horizontally disposed conveying duct, fan means delivering a stream of air to one end of said duct at a relatively high velocity, an air escape opening in the opposite end of said duct, a material discharge opening thereunder, a boot opening into the top wall of said duct interjacent the ends thereof, a gravity discharging material hopper mounted thereon to empty into said pipe, a plate in said boot extending obliquely in the direction of said fan means, a second plate thereunder extending into said duct obliquely in an opposite direction, the space between said plates forming a discharge opening for said material, a normally closed valve of sufficient size to block said opening hingedly mounted on the lower edge of said first-mentioned plate and depending slightly below said second-mentioned plate, said valve being swung open by the pressure of the material in said hopper and the force of the air stream except when regulated by back pressures built up in the duct on blocking of the air escape and material discharge openings in the end of said duct.

3. The combination defined in claim 2 in which stop means in said duct limits the opening of said valve.

References Cited in the file of this patent

UNITED STATES PATENTS

| | | |
|---|---|---|
| 1,818,367 | Wallace | Aug. 11, 1931 |

FOREIGN PATENTS

| | | |
|---|---|---|
| 333,118 | Great Britain | Aug. 7, 1930 |